Sept. 13, 1932.  E. R. WALKER  1,877,095
TRUCK
Filed May 7, 1931  2 Sheets-Sheet 1
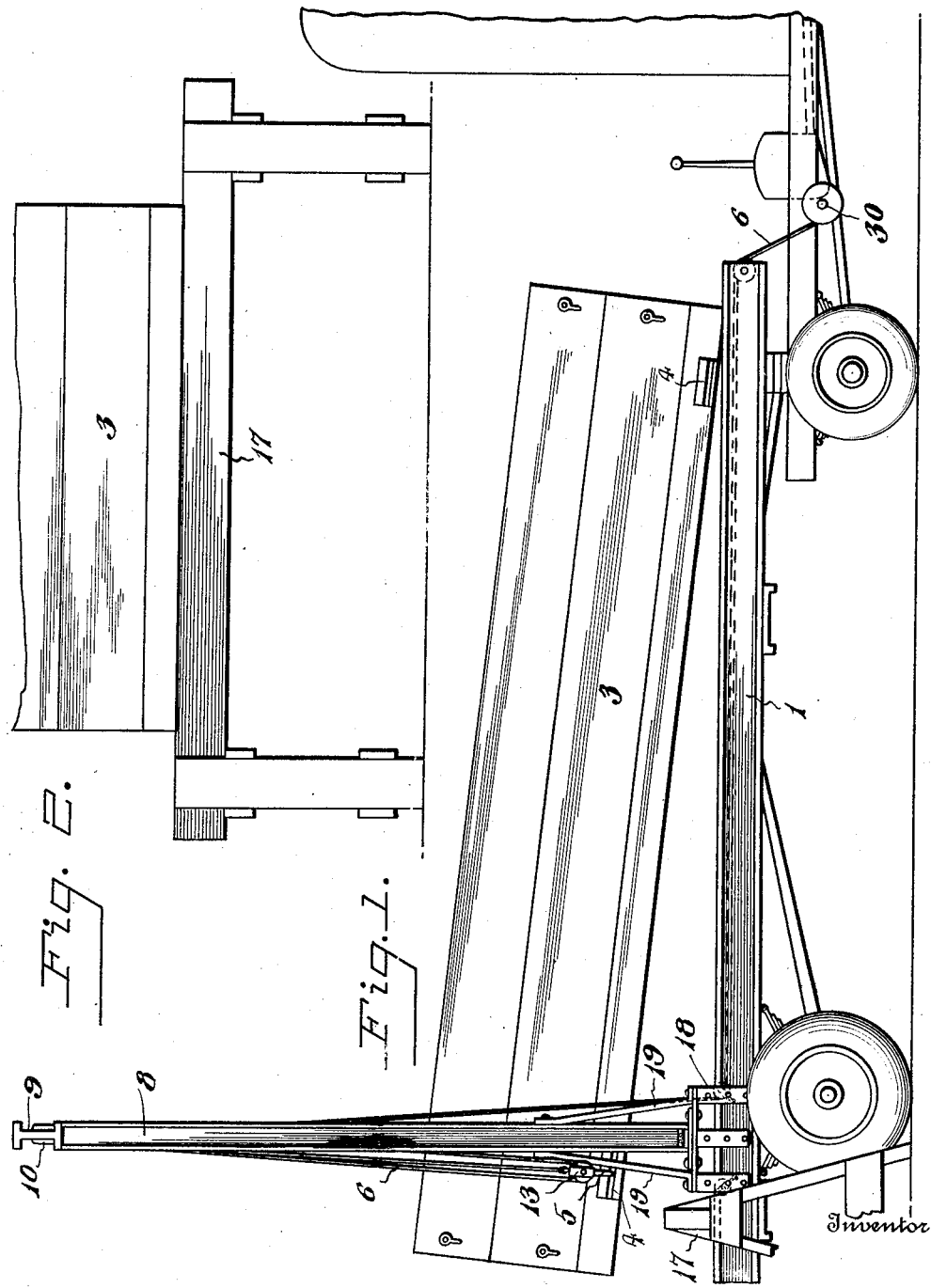
Inventor
Earl R. Walker
By Lacey & Lacey, Attorneys Sept. 13, 1932.  E. R. WALKER  1,877,095
TRUCK
Filed May 7, 1931  2 Sheets-Sheet 2
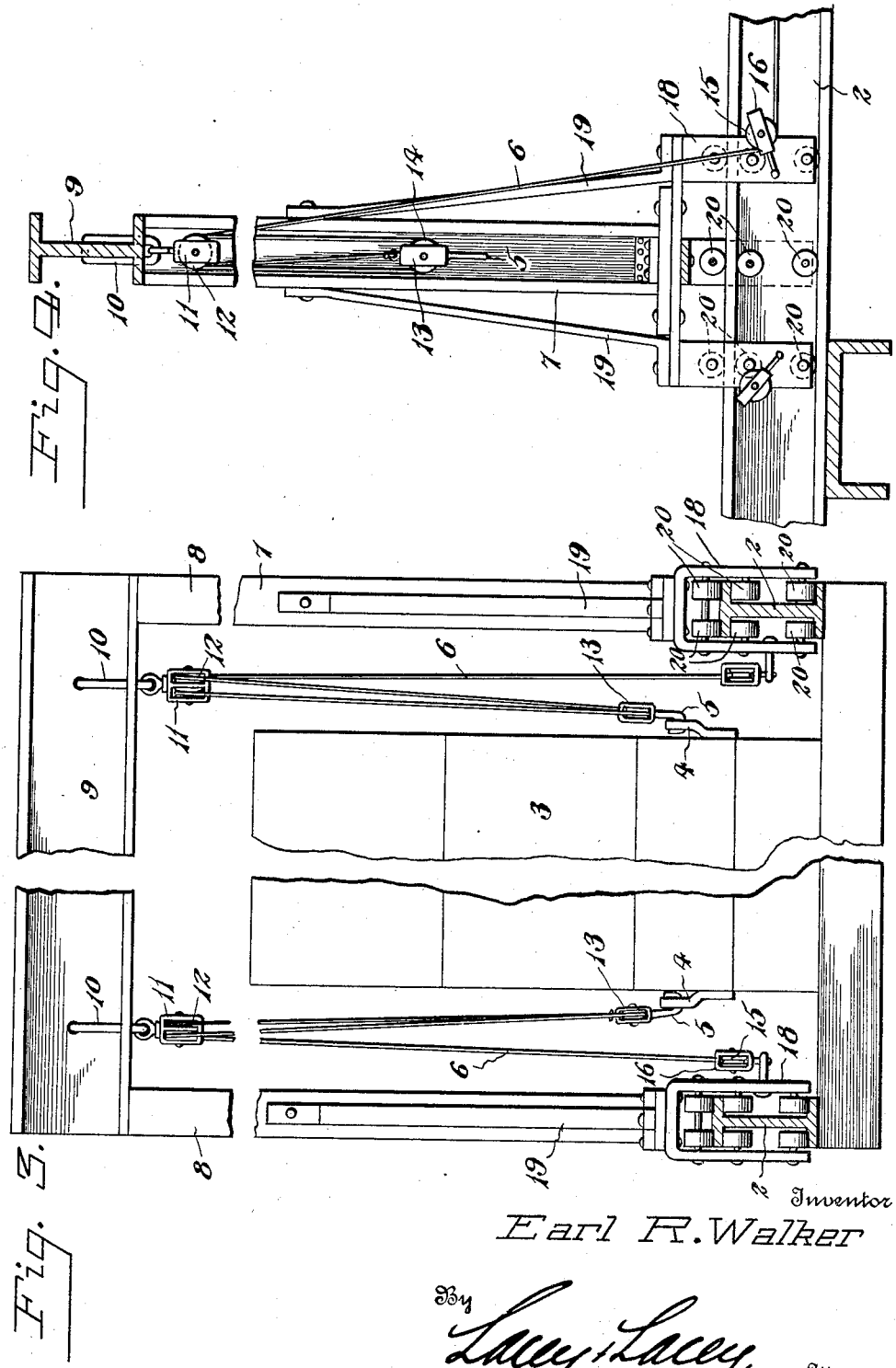
Inventor
Earl R. Walker
By Lacey & Lacey,
Attorneys Patented Sept. 13, 1932

1,877,095

UNITED STATES PATENT OFFICE

EARL R. WALKER, OF MIDDLETOWN, INDIANA

TRUCK

Application filed May 7, 1931. Serial No. 535,775.

This invention relates to trucks, trailers and other vehicles for hauling goods and has for its object the provision of means whereby a loaded body may be removed from the chassis and left at a destination, and other bodies, loaded or unloaded, transferred to the chassis for transportation to other points. The invention has also for its object the provision of means for the stated purpose which will be simple and inexpensive but efficient in operation. Other objects will appear incidentally in the course of the following description, and the invention resides in certain novel features which will be particularly pointed out in the appended claim.

In the accompanying drawings, which illustrate one embodiment of the invention,

Figure 1 is a side elevation of a truck having the invention applied thereto, Fig. 2 is a diagrammatic rear elevation, Fig. 3 is an enlarged elevation, with parts in transverse section, and Fig. 4 is an enlarged side elevation, with parts in longitudinal section.
The chassis 1 may be of any approved or known design and includes side bars or sills 2 which are of channeled or I-beam construction, as shown clearly in Fig. 3. The body 3 may also be of any approved design and is illustrated in a conventional manner as a box-like form or case adapted to rest upon the chassis and be carried thereby. Upon the sides of the body are secured hooks or suspending brackets 4 which may be engaged by hooks 5 carried by cables 6 provided at the sides of the body, as will be more fully set forth. The hooks or lugs or brackets 4 are provided on both sides of the body and adjacent both the front and rear thereof.
Supported on the chassis and arranged to travel longitudinally thereof is a derrick or hoisting frame 7 consisting of side bars or standards 8 and a cross beam 9 secured upon the standards and connecting the upper ends of the same. The cross beam has mounted thereon suspending loops 10 disposed adjacent the opposite ends thereof, and in these loops 10 are mounted blocks 11 housing pulleys 12 in a well-known manner. The cables 6 are trained about the pulleys 12, and each cable has one end attached to a block 13 from which the hook 5 depends and in which is mounted a pulley 14. The cables each extend from the respective block 13 up to and around one of the pulleys 12 and then around the pulley 14, thence back upwardly and around the other pulley 12, and thence downwardly to an idle pulley 15 mounted in a block or bracket 16 on the derrick frame at the inner side of the sills 2 of the truck. From the pulley 15, the cable extends forwardly to a power take-off device connected with the power plant of the truck, so that when the body is to be lifted the hooks 5 are engaged in the brackets 4 and power then applied to the cables 6 through a winding drum or shaft 30 adjacent the front end of the truck so that the cable will be wound on said drum or shaft and, consequently, will exert a lifting force upon the body. This lifting force is applied first at the rear end of the body so that it may be raised, as shown in Fig. 1, and a trestle 17 placed thereunder, so that, if the end of the body be then lowered onto the trestle, the trestle will support it in raised position. The operation is then repeated at the front end of the body and a trestle placed under the front end so that the truck may then be driven forward, leaving the body supported on the trestles, it being understood, of course, that the hooks 5 are disengaged from the lugs or brackets 4 before the truck is driven forward.

The derrick or hoisting frame is mounted upon the sills of the truck so as to be readily movable along the same, and to this end is includes carriages 18 which are in the form of inverted U-shaped frames adapted to span the respective sills or side bars of the chassis and upon which the lower ends of the standards 8 are riveted or otherwise permanently secured, braces 19 being provided between the standards and the carriages to reinforce the same. Mounted on the inner sides of each carriage are a plurality of rollers 20 which are arranged to ride upon the upper surfaces of the lower flange of the respective sills or side bars and upon both the upper and lower surfaces of the upper flanges of the side bars, as shown clearly in Fig. 3. The rollers provide for ready travel of the frame and also serve to hold the same in proper relation to the sills or side bars, so that when movement of the derrick along the truck chassis is desired it may be very readily effected. The idler pulleys 15 are mounted directly on the carriages and are provided at both ends thereof so that the cables may be disposed in such manner as may be most convenient or advantageous under any given conditions.

By the use of my invention, the hauling of goods by the use of trucks may be very materially facilitated and expedited. A body or box may be loaded in advance of the arrival of a truck and quickly disposed in carrying position upon the truck. Regular routes may be established for the trucks and stations located along the routes at which bodies may be delivered from the trucks and other loaded bodies deposited on the trucks for transportation to other stations, the bodies being loaded or unloaded in the intervals between the dispatch of one truck and the arrival of a later truck. It will be readily noted that the apparatus is very simple and compact and will not interfere with the ordinary use of the truck but may be mounted upon any truck upon which its use may be desired.

Having thus described the invention, I claim:

Apparatus for the purpose set forth comprising carriages adapted to span the sills of a truck chassis, rollers mounted within the carriages to engage the flanges of said sills, a derrick comprising standards secured upon and rising from the carriages and a cross beam connecting the upper ends of the standards, pulleys mounted upon the carriages and upon the cross beam, cables trained about said pulleys and connected with a winding member upon the truck chassis, and body-suspending pulleys mounted upon the cables.

In testimony whereof I affix my signature.

EARL R. WALKER. [L. S.]